(12) United States Patent
Hwang et al.

(10) Patent No.: US 7,396,636 B2
(45) Date of Patent: Jul. 8, 2008

(54) SEGMENTED RESIST ISLANDS FOR PHOTOLITHOGRAPHY ON SINGLE SLIDERS

(75) Inventors: Cherngye Hwang, San Jose, CA (US); Kim Y. Lee, Fremont, CA (US); Dennis R. McKean, Milpitas, CA (US); Gary Suzuki, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 547 days.

(21) Appl. No.: 10/928,038

(22) Filed: Aug. 27, 2004

(65) Prior Publication Data

US 2006/0045971 A1    Mar. 2, 2006

(51) Int. Cl.
*G03F 7/00* (2006.01)
(52) U.S. Cl. .................. 430/320; 430/322; 430/394; 430/330
(58) Field of Classification Search .......... 430/320, 430/322, 330, 394
See application file for complete search history.

(56) References Cited

U.S. PATENT DOCUMENTS

| | | | |
|---|---|---|---|
| 2002/0094492 A1* | 7/2002 | Randall et al. | 430/311 |
| 2004/0250414 A1* | 12/2004 | Lelong | 29/603.18 |
| 2004/0265531 A1* | 12/2004 | McKean et al. | 428/41.9 |
| 2005/0164134 A1* | 7/2005 | Shirley et al. | 430/330 |

FOREIGN PATENT DOCUMENTS

GB        2166888    *    5/1986

\* cited by examiner

*Primary Examiner*—Mark F. Huff
*Assistant Examiner*—Caleen O Sullivan

(57) ABSTRACT

A method for creating segmented resist islands for photolithography on single sliders is disclosed. The method includes ramping the temperature of a number of single sliders, to a temperature that is below a proper softbake temperature. The single sliders reside in a divider and the single sliders and walls of the divider have a layer of resist deposited on them. Coarse lithography is then performed to remove the resist from above portions of the walls of the divider; and the temperature of the single sliders, the resist and the divider is then ramped to a proper softbake temperature.

20 Claims, 15 Drawing Sheets

300b

SEGMENTED RESIST ISLANDS FOR PHOTOLITHOGRAPHY ON SINGLE SLIDERS

RELATED ART

The method for manufacturing read/write heads for memory devices such as hard drive memory has evolved significantly over the past decade. The read/write head rides on sliders that are designed to "fly" or "soar" above a spinning disk at an appropriate height for the read/write head to function accurately. These sliders have aerodynamic features or "wings" on their air bearing surface (ABS) to allow them to soar at the appropriate height. These features are generated by a photolithographic process on sliders that have been polished to an appropriate stripe height.

In the conventional art, these sliders have been generated on a wafer and then cut into slices having a row of many sliders. The ABS of the row of sliders is then polished to achieve a proper stripe height across the whole row of sliders. As memory devices have become smaller and smaller, it has become very difficult to control the polishing to achieve the proper stripe height across the whole row of sliders.

One approach to solving the problem of achieving proper height has been to cut the row of sliders into individual sliders and then polish the air bearing surface of the individual sliders to the proper stripe height. After polishing, a lithographic process is performed to create the features known as "wings" that cause the sliders to soar at the appropriate height. Currently, photolithography is performed on a square array of single sliders mounted in stainless steel dividers, held in place by a polymer adhesive. One process to define ABS patterns requires the application of a typical novolac photoresist in thicknesses ranging from 5 microns to 25 microns. Although the problem of polishing to an appropriate stripe height was solved by the approach of polishing individual sliders, a problem now exists due to large disparities in thermal expansion coefficients between resist, the sliders and the divider materials. Stress is now induced in the thick resist film during the resist bake causing cracks to form in the resist film at the edges of the sliders as the resist cools. The cracks in turn interfere with the exposure process, giving rise to defects, specifically "mouse bites" and resist ridges. This is illustrated in prior art FIGS. 1A-1E below. Prior art FIGS. 1A-1E are cross-sectional views of two individual sliders in a divider, illustrating steps in the prior art process for performing photolithography on individual sliders. These figures will be discussed sequentially and in relationship to each other.

Prior art FIG. 1A is a cross-sectional view 100a of two sliders 105a and 105b, following the application of resist, resting in a divider 108 having walls 110 that create partitions between individual sliders. Typically a divider can be square and designed to contain a plurality of single sliders. An adhesive 115, usually a polymer adhesive, is applied over divider 108 and divider walls 110 to hold the sliders 105a and 105b in place in divider 108. Resist 120 is then applied and spun and is shown to cover sliders 105a and 105b, adhesive 115 and divider walls 110.

Prior art FIG. 1B is a cross-sectional view 100b of the two sliders 105a and 105b of FIG. 1A following a ramp bake. A micro-crack 125 is shown to have been formed as the result of the stresses induced due to the disparity between the coefficients of thermal expansion of the thick resist 120, the sliders 105, the adhesive material 115 and the divider wall 110.

Prior art FIG. 1C is a cross-sectional view of the two sliders 105a and 105b of FIG. 1A during the photolithographic exposure process for forming aerodynamic features on the ABS of the sliders 105. The arrows indicate the light direction for exposing the resist. Masks 130a and 130b are shielding the resist over sliders 105a and 105b, respectively. However, the existence of micro-crack 125 causes perturbations in the exposure of resist 120 other than what would be expected.

Prior art FIG. 1D is a cross-sectional view of the two sliders 105a and 105b of FIG. 1A following the develop step of the photolithographic process for forming the "wings" on sliders 105a and 105b. The resist 120 remains in regions 135, 140 and 145. Region 145 is a proper formation to create the wing upon ion milling. However, region 135 is an example of a resist with a "mouse bite" resulting from the light entering under the resist from the side, as shown in prior art FIG. 1C, due to micro-crack 125. Region 140 shows a resist ridge that remains due to the light being redirected through crack 125.

Prior art FIG. 1E illustrates a cross-section of sliders 105a and 105b with aerodynamic "wings" or features 150, 155 and 160 following ion milling. Feature 160 is a proper feature, but features 150 and 155, resulting from improper exposure due to the formation of micro-crack 125, do not have the proper aerodynamic configuration.

One conventional approach to solving the problem of the formation of micro-cracks is to lower the baking temperature from somewhere in the range of 70 degrees C. to 90 degrees C. to approximately 50 degrees C. This allows the stresses in the resist to relax. Although this lower baking temperature results in removing the cracking problem, it does so at the expense of pattern fidelity and resist sidewall integrity. Furthermore, the patterned resist has been found to be unacceptable for subsequent ion-milling, resulting in loss of railwidth control. Adhesion failure or loss of patterned features also frequently occurs with inadequate bake temperatures. It is known that the resist needs to be baked to a minimum softbake temperature, in this case at least 70 degrees C., to improve lithographic performance and to render it robust against ion-milling for railwidth control. However, as stated above, when conventionally formed and the resist is baked at 70 degrees C. or greater, cracks may form.

SUMMARY

A method for creating segmented resist islands for photolithography on single sliders is disclosed. The method includes ramping the temperature of a number of single sliders, to a temperature that is below a proper softbake temperature. The single sliders reside in a divider and the single sliders and walls of the divider have a layer of resist deposited on them. Coarse lithography is then performed to remove the resist above portions of the walls of the divider; and the temperature of the single sliders, the resist and the divider is then ramped to a proper softbake temperature.

BRIEF DESCRIPTION OF THE DRAWINGS

Prior art

DETAILED DESCRIPTION

Reference will now be made in detail to embodiments of the invention, examples of which are illustrated in the accompanying drawings. While the invention will be described in conjunction with the embodiments, it will be understood that they are not intended to limit the invention to these embodiments. Furthermore, in the following detailed description, numerous specific details are set forth in order to provide a thorough understanding of the present invention. In other instances, well known methods, procedures, and components have not been described in detail so as not to unnecessarily obscure aspects of the present invention.

Embodiments of the present invention include a method for creating segmented resist islands for photolithography on individual sliders. The main purpose of the present invention is to eliminate the formation of micro-cracks that can form during the baking of the resist, due to the differential coefficients of thermal expansion of the materials (e.g., the slider, the walls of a stainless steel divider that isolates it from other sliders and maintains it in a proper position for photolithography, and an adhesive that holds the slider in place) that can contact the resist during the baking process. This is achieved by removing the resist in the location between the sliders partway through the ramping to temperature of the baking process, then continuing to ramp the temperature until the proper softbake temperature is reached for the baking to be finished. By so doing, the resist layer is segmented into individual islands such that each resist island covers an entire single slider. The central idea is that the thermal stresses from elevated baking temperatures acting on a resist island are greatly reduced compared to those acting on a continuous resist layer over the entire array of sliders.

Figure 4:
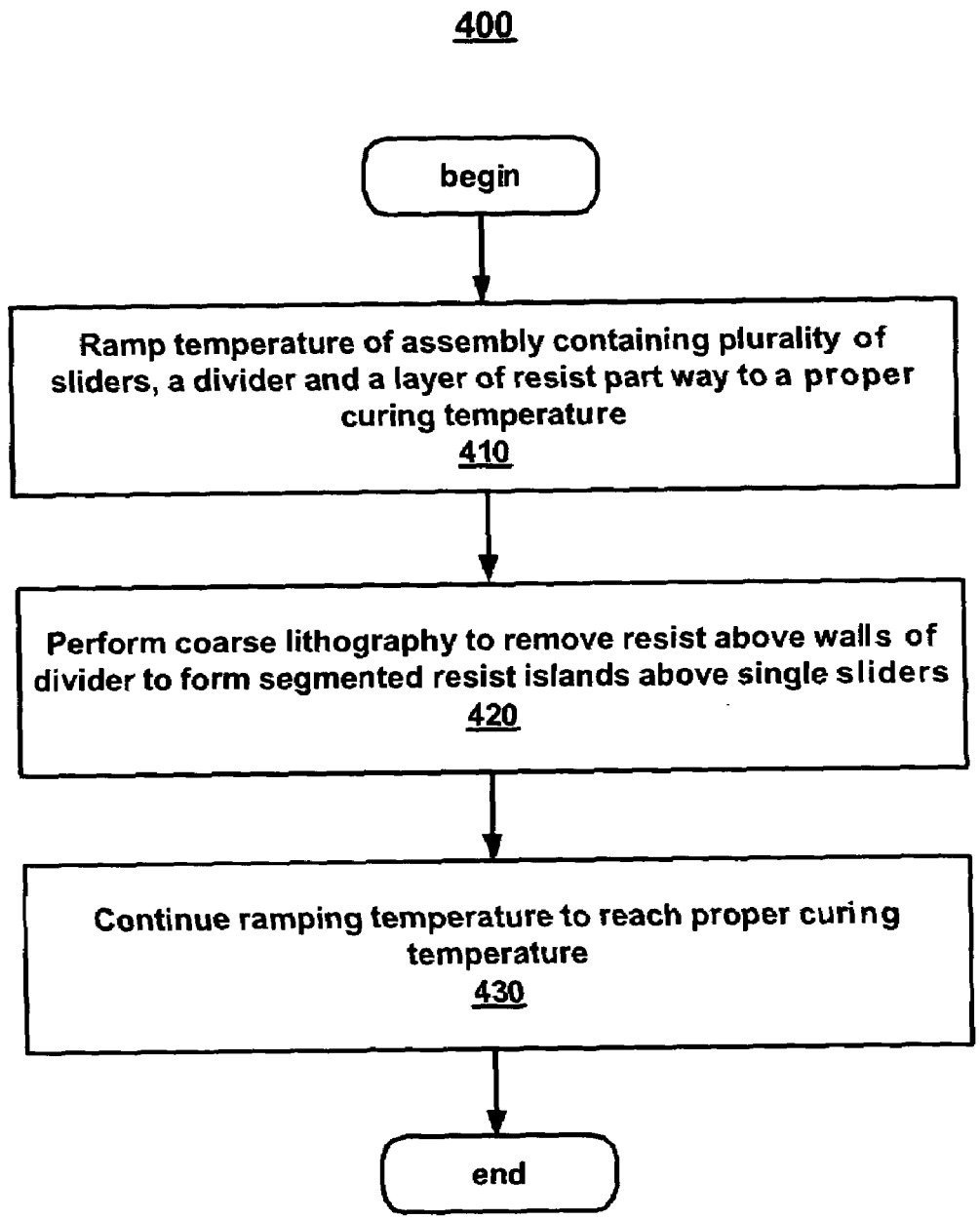
FIG. 4 is a flow diagram of a method for creating segmented resist islands for reducing stresses during photolithography on single sliders, in accordance with one embodiment of the present invention.

Certain portions of the detailed descriptions of embodiments of the invention, which follow, are presented in terms of processes and methods (e.g., Method 400 of FIG. 4). Although specific steps are disclosed herein describing the operations of these processes and methods, such steps are exemplary. That is, embodiments of the present invention are well suited to performing various other steps or variations of the steps recited in the processes and methods herein.

FIGS. 2A-2D are cross-sectional views of two individual sliders in a divider, illustrating steps in a process for creating segmented resist islands for reducing stresses during photolithography on single sliders, in accordance with one embodiment of the present invention. The sliders are initially formed in a wafer that is subsequently sliced into rows and the row of sliders is cut into individual sliders. The air bearing surface of the individual sliders is polished to the proper stripe height. After polishing, a photolithographic process is performed to create features known as "wings" that cause the sliders to soar at the appropriate height.

The photolithography is performed on an array of single sliders that is typically, according to one embodiment, a square array of four sliders. In other embodiments, the array of single sliders can be any size and shape of array that may be suitable to a particular fabrication set-up. The individual sliders may be mounted in stainless steel dividers and, according to one embodiment, held in place by a polymer adhesive. In other embodiments the sliders may be held in place by adhesives other than polymers that will allow removal of the sliders from the dividers following photolithography.

To define the ABS patterns or "wings," a resist such as AZ9260 is deposited on the array of individual sliders, their divider walls and any exposed adhesive, to a thickness in a range of 5 microns to 25 microns, according to one embodiment. The resist may be spun on, or may be deposited by one of any number of deposition techniques. It should be understood that resists other than AZ9260 that are determined to function adequately in the fabrication of the ABS patterns may be used.

Figure 1A:
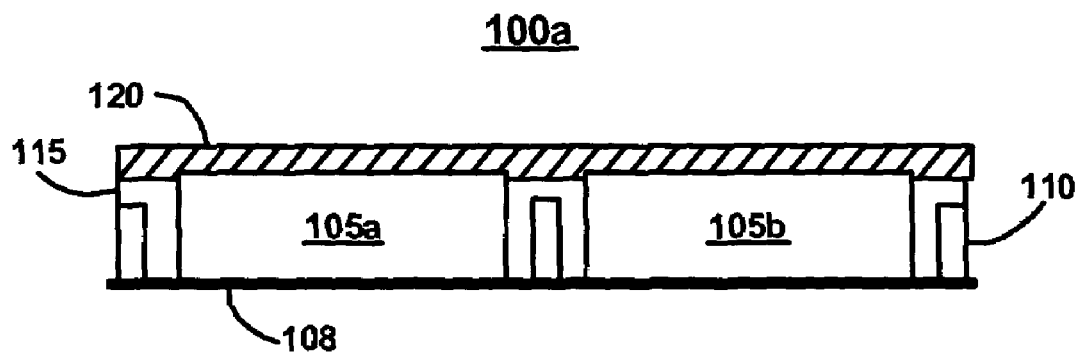
FIGS. 1A-1E are cross-sectional views of two individual sliders in a divider, illustrating steps in a process for performing photolithography on individual sliders according to the conventional art.
Figure 1B:
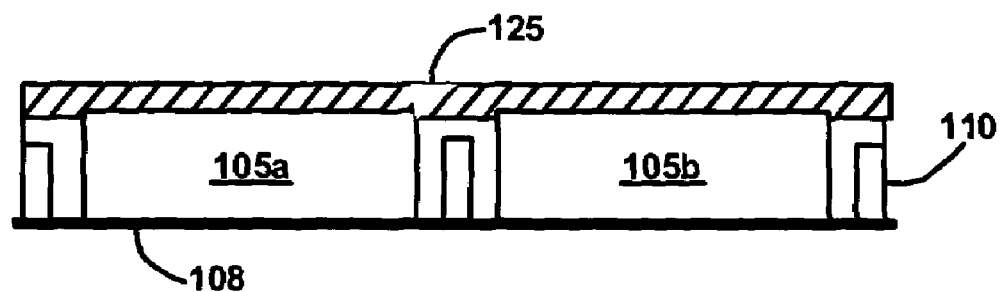
Figure 1C:
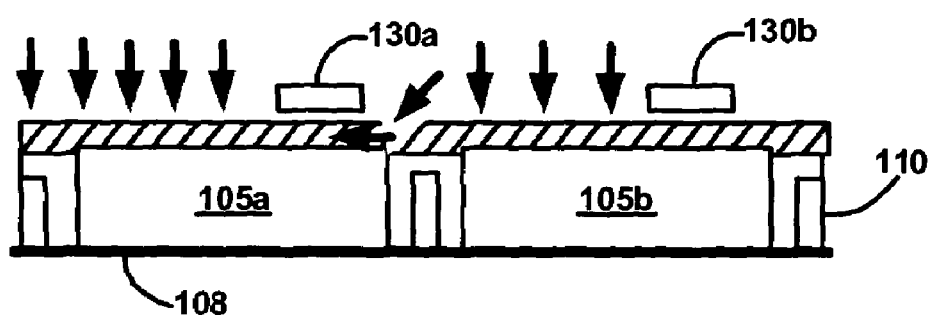
Figure 1D:
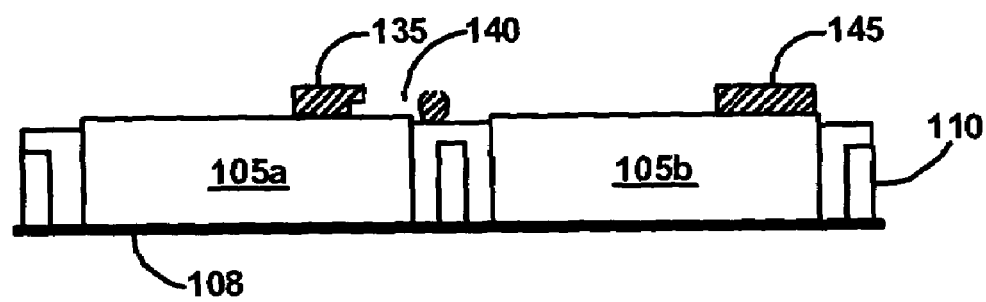
Figure 1E:
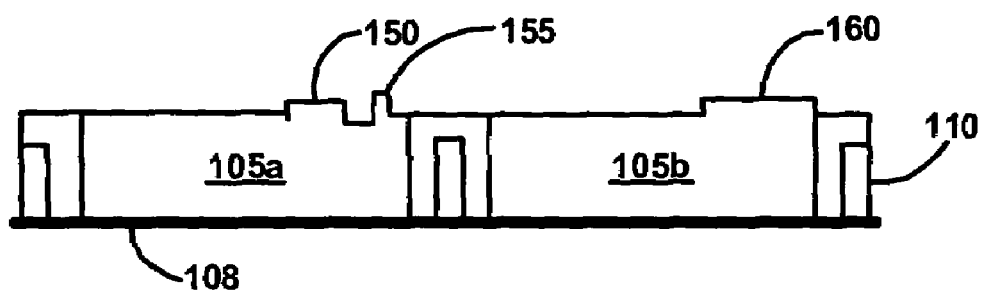
Figure 2A:
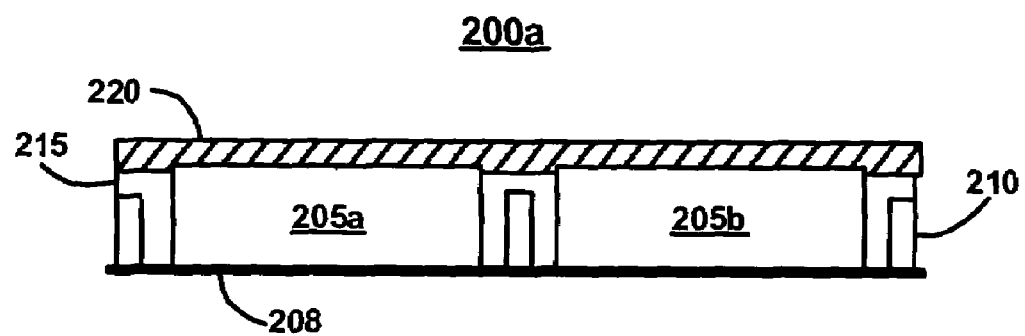
FIGS. 2A-2D are cross-sectional views of two individual sliders in a divider, illustrating steps in a process for creating segmented resist islands for reducing stresses during photolithography on single sliders, in accordance with one embodiment of the present invention.

FIG. 2A is a cross-sectional view 200a of two sliders 205a and 205b, following the application of resist, resting in a divider 208 having walls 210 that create partitions between individual sliders, in accordance with one embodiment of the present invention. An adhesive 215, usually a polymer adhesive, is applied over divider 208 and divider walls 210 to hold the sliders in place in divider 108 prior to the deposition of the resist. Resist 220 is then applied, spun, and is shown to cover the entire array containing sliders 205, adhesive 215 and divider walls 210.

Figure 2B:
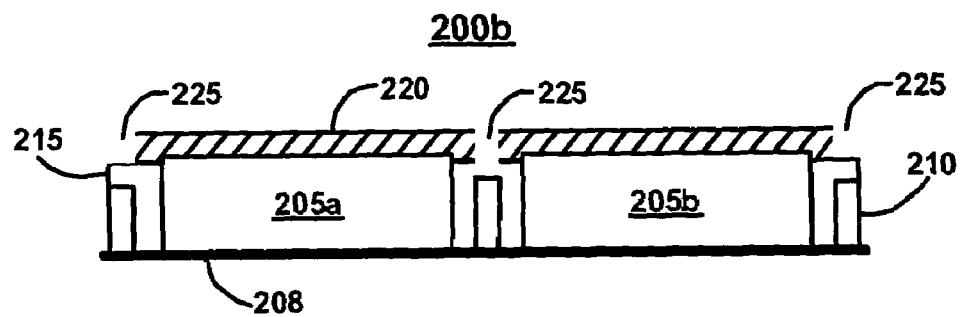

FIG. 2B is a cross-sectional view 200b of the two sliders 205a and 205b of FIG. 2A, according to one embodiment, after a coarse lithography has been performed to segment the resist layer into resist islands following a ramp bake to a temperature that is partway to the final softbake temperature. The proper softbake temperature is at least 70 degrees C. A temperature that is partway to the proper softbake temperature can be a temperature that is approximately in the range of 50 degrees C. to 55 degrees C. By approximately, we mean that, due to variations in the accuracy of measuring devices, there may be minor deviations in the actual temperature that place it outside the stated range, but that are inconsequential to the process. The coarse lithography removes the resist from the areas 225 that are substantially above the walls 210 of divider 208. A coarse lithography is adequate, in that fidelity is not essential to the separation of the resist into islands.

Following the coarse lithography, the array of segmented islands is again ramped in temperature until the softbake temperature is reached at which time it is baked according to conventional processes. By segmenting the resist into islands, thermal stresses are eliminated at a lower temperature, only after reaching a temperature sufficient to support the coarse lithography, but before the stresses form sufficiently to create stress fracture micro-cracks.

Figure 2C:
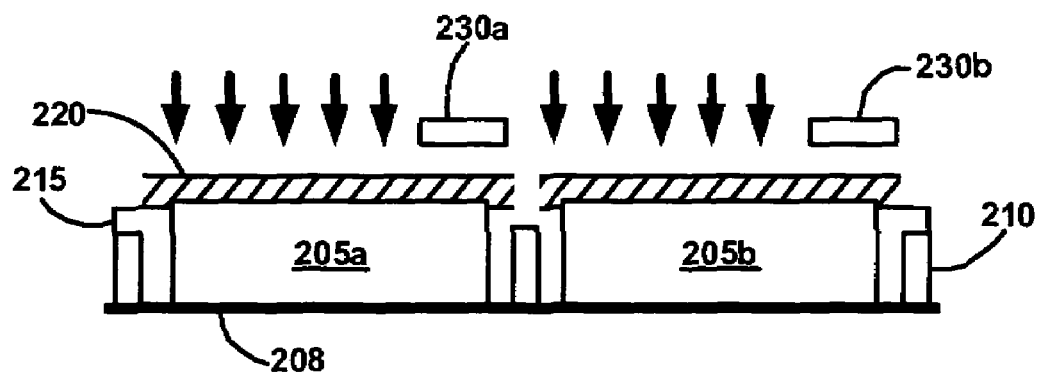

FIG. 2C is a cross-sectional view of an embodiment showing the two sliders 205a and 205b of FIG. 2A during the photolithographic exposure process for forming aerodynamic features on the ABS of the sliders 205. The arrows indicate the light direction for exposing the resist. Masks 230a and 230b are shielding the resist over sliders 205a and 205b, respectively. Due to the elimination of stresses due to the removal of resist to form areas 225, light is not able to enter under the masks 130 and only the areas of resist that are intended to be exposed are so.

Figure 2D:
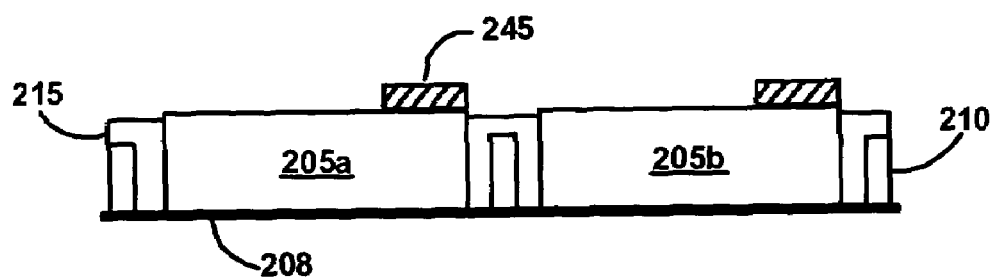

FIG. 2D is a cross-sectional view showing the two sliders 205a and 205b of FIG. 2A, according to one embodiment of the present invention, following the develop step of the photolithographic process for forming the aerodynamic "wings" on the ABS of sliders 205. The resist 220 remains in regions 245 and is in a proper formation to create the wing upon ion milling.

Figure 3A:
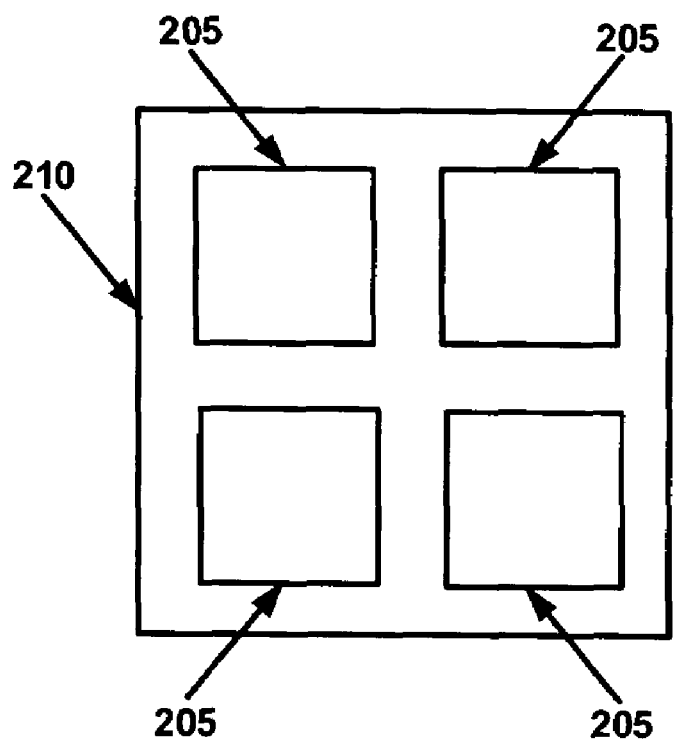
FIGS. 3A-3D are plan views illustrating steps in a method for reducing stresses during the process of forming single sliders, in accordance with one embodiment of the present invention.

FIGS. 3A-3D are plan views illustrating steps in a method for reducing stresses during the process of forming single sliders, in accordance with one embodiment of the present invention. FIG. 3A illustrates a square array of four sliders 205, prior to the application of a resist and according to one embodiment, that are placed in stainless steel divider 210 and held in place by an adhesive.

Figure 3B:
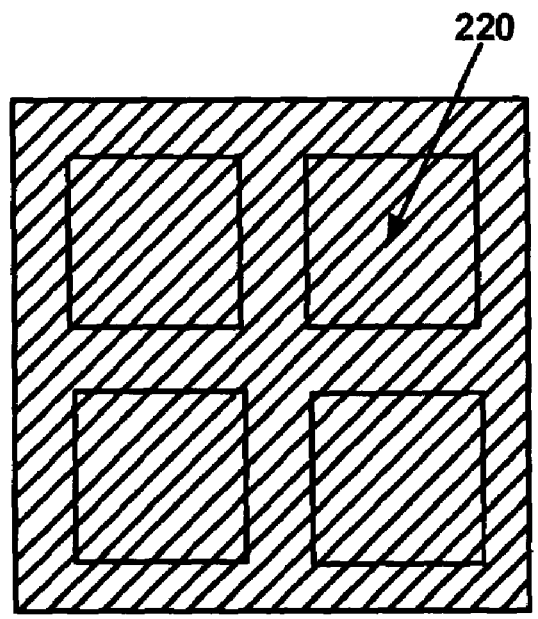

FIG. 3B illustrates the array as described in FIG. 3A, in accordance with an embodiment of the present invention, following the deposition of a resist, as described in FIG. 2A above.

Figure 3C:
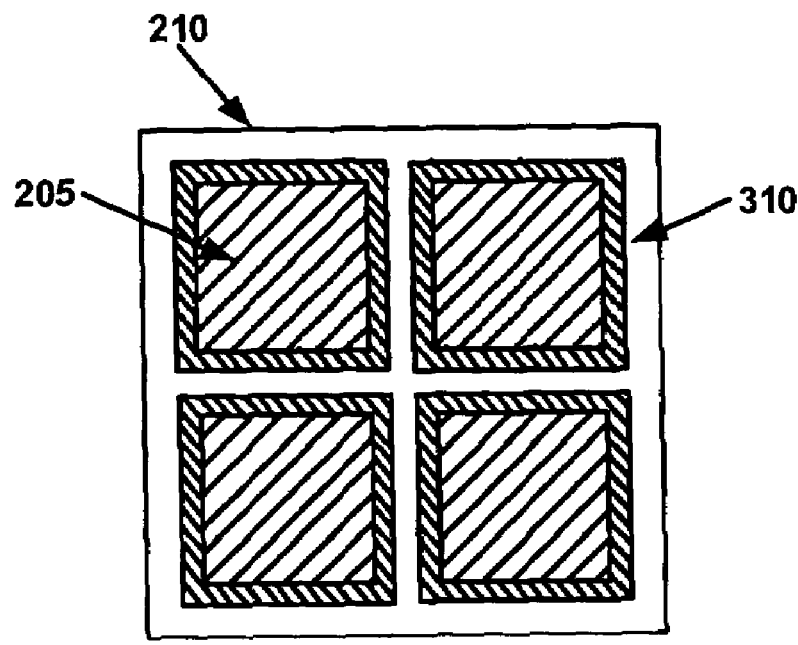

FIG. 3C illustrates the segmented islands that are formed by coarse lithography at a temperature that is partway to the softbake temperature, according to one embodiment and as described in FIG. 2B above.

Figure 3D:
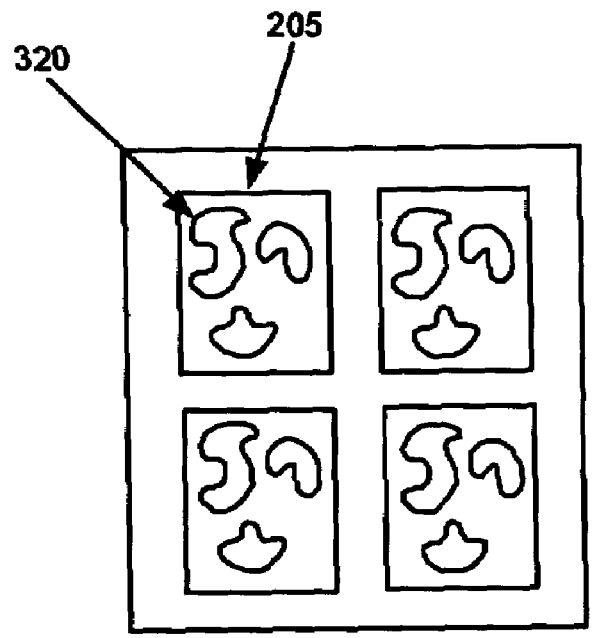

FIG. 3D illustrates aerodynamic features 320 on the ABS surfaces of sliders 205 following lithography and ion milling in accordance with an embodiment of the present invention. The features 320 are not to be construed as typical of the size and/or shape of such features, but only to illustrate that the features are complete, with no defects due to resist mousebites or ridges as might be found in the conventional art in which stress induced micro-cracks were formed during the baking process in a non-segmented array of sliders.

FIG. 4 is a flow diagram of a method 400 for creating segmented resist islands for reducing stresses during photolithography on single sliders, in accordance with one embodiment of the present invention. The sliders are initially formed in a wafer that is subsequently sliced into rows and the row of sliders is cut into individual sliders. The air bearing surface of the individual sliders is polished to the proper stripe height. After polishing, a photolithographic process is performed to create features known as "wings" that cause the sliders to soar at the appropriate height.

The photolithography may be performed on an array of single sliders that is typically, according to one embodiment, a square array of four sliders. For purposes of clarity and brevity, the following discussion will explain the present method with respect to a square array of four sliders. It should be noted, however, that although such an example is explicitly provided below, the method of the present invention is well suited to use with various other shapes and sizes of arrays that may be suitable to a particular fabrication set-up.

At step 410, the temperature of the assembly of sliders is ramped to a temperature that is below a proper softbake temperature. The individual sliders reside in a divider and a resist is deposited over the assembly, covering the individual sliders and the walls of the divider, as illustrated in FIG. 3B above. The proper softbake temperature is at least 70 degrees C. A temperature that is below the proper softbake temperature can be a temperature that is approximately in the range of 50 degrees C. to 55 degrees C. By approximately, we mean that, due to variations in the accuracy of measuring devices, there may be minor deviations in the actual temperature that place it outside the stated range, but that are inconsequential to the process.

At step 420 of FIG. 4, coarse lithography is performed to remove the resist from areas that are substantially above portions of the walls of the divider to form segmented resist islands above each of the single sliders. Coarse lithography is adequate for this step of the process in that fidelity is not essential to the separation of the resist into islands. By segmenting the resist into islands, thermal stresses are eliminated at a lower temperature, only after reaching a temperature sufficient to support the coarse lithography, but before the stresses form sufficiently to create stress fracture microcracks.

At step 430, the ramping of the temperature of the array continues until the softbake temperature is reached and the array may then be baked according to conventional methods in preparation for the critical lithography.

Figure 5:
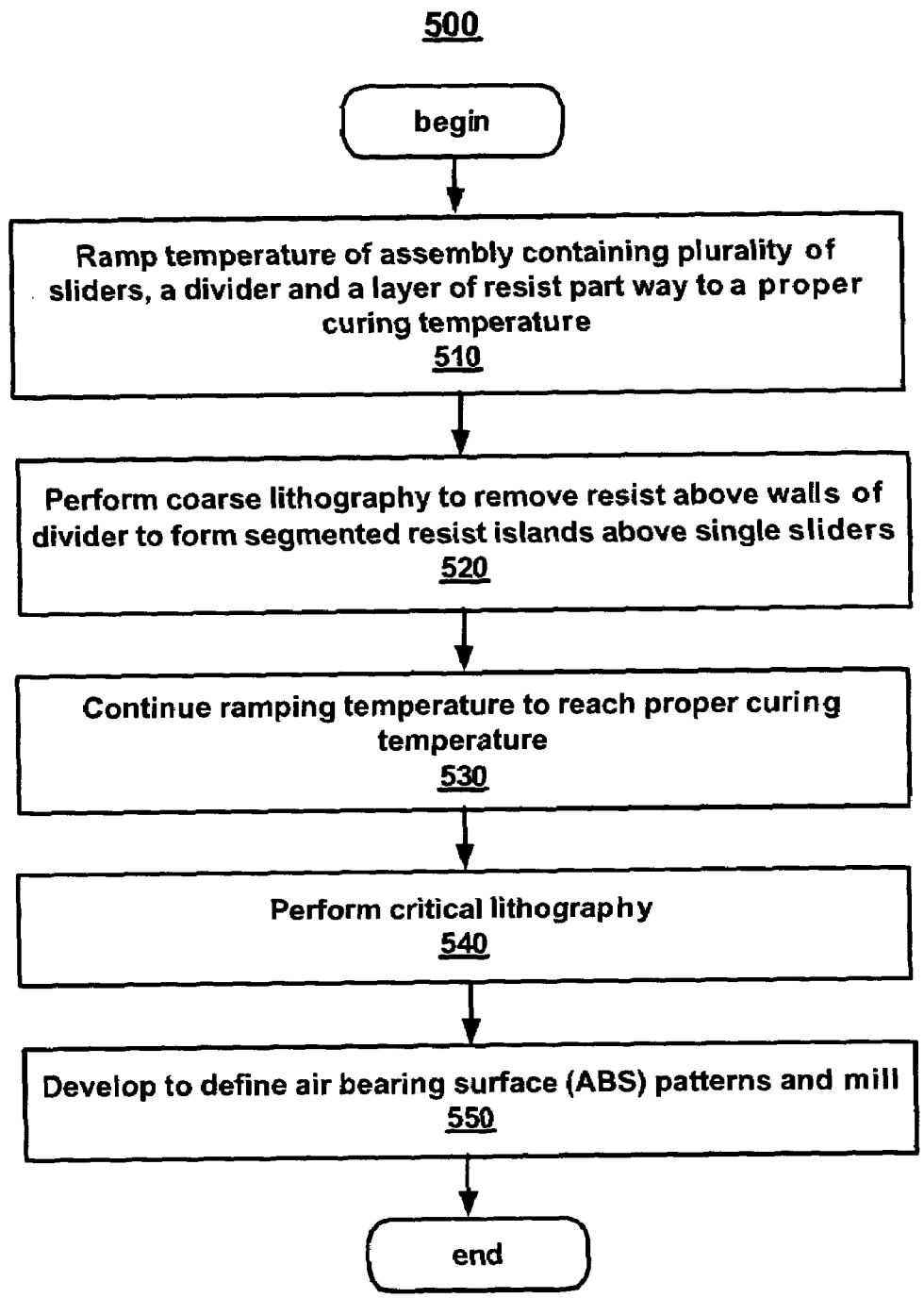
FIG. 5 is a flow diagram of another embodiment of a method for creating segmented resist islands for reducing stresses during photolithography on single sliders is described in accordance with the present invention.

Referring now to FIG. 5, a flow diagram of another embodiment of method 500 for creating segmented resist islands for reducing stresses during photolithography on single sliders is described in accordance with the present invention. Steps 510 through 530 are the same as steps 410 through 430, respectively, of FIG. 4 above.

At step 540, critical lithography is performed to expose the unmasked areas on the ABS where the aerodynamic wing patterns will be formed. This step is illustrated in FIG. 2C above.

At step 550, as illustrated in FIG. 2D, the sliders are then developed to remove the resist from the unmasked areas to define the ABS patterns, and the surfaces are then milled to create the aerodynamic sliders. These are illustrated in FIG. 3D above.

Thus, the present invention provides, in various embodiments, a method for creating segmented resist islands for photolithography on single sliders. The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for creating segmented resist islands for photolithography on a plurality of single sliders, comprising:
    ramping the temperature of said plurality of single sliders to a temperature that is below proper softbake temperature, wherein said plurality of single sliders resides in a divider and wherein said plurality of single sliders and walls of said divider have a layer of resist deposited thereon;
    performing coarse lithography to remove said resist above portions of said walls of said divider; and
    continuing ramping of temperature of said plurality of single sliders, said resist and said divider to said proper softbake temperature.

2. The method as recited in claim 1 further comprising:
    performing critical lithography on said plurality of single sliders to expose air bearing surface (ABS) patterns; and
    developing said plurality of single sliders to define ABS patterns on said plurality of single sliders.

3. The method as recited in claim 1 wherein said divider is stainless steel.

4. The method as recited in claim 1 wherein said divider comprises islands to accommodate at least four of said single sliders.

5. The method as recited in claim 1 wherein said single slider is held in place in said divider by a polymer adhesive.

6. The method as recited in claim 1 wherein said ramping partway to said softbake temperature allows said performing coarse lithography to occur before resist completely hardens.

7. The method as recited in claim 1 wherein said partway to said softbake temperature is in a range that is approximately 50 degrees C. to 55 degrees C.

8. The method as recited in claim 1 wherein said softbake temperature is at least 70 degrees C.

9. A method for reducing stresses during the lithographic process for forming a plurality of single sliders, comprising:

ramping the temperature of said plurality of single sliders, to a temperature that is below proper softbake temperature, wherein said plurality of single sliders resides in a divider and wherein said plurality of single sliders and walls of said divider have a layer of resist deposited thereon;

performing coarse lithography to remove said resist above portions of said walls of said divider; and continuing ramping of temperature of said plurality of single sliders, said resist and said divider to said proper softbake temperature.

10. The method as recited in claim 9 further comprising:

performing critical lithography on said plurality of single sliders to expose air bearing surface (ABS) patterns; and developing said plurality of single sliders to define ABS patterns on said plurality of single sliders.

11. The method as recited in claim 9 wherein said divider is stainless steel.

12. The method as recited in claim 9 wherein said divider comprises islands to accommodate at least four of said plurality of single sliders.

13. The method as recited in claim 9 wherein each of said plurality of single sliders is held in place in said divider by a polymer adhesive.

14. The method as recited in claim 9 wherein said softbake temperature is at least 70 degrees C.

15. A method for forming a plurality of single sliders using a slider divider, comprising:

ramping the temperature of said plurality of single sliders, to a temperature that is below proper softbake temperature, wherein said plurality of single sliders resides in a divider and wherein said plurality of single sliders and walls of said divider have a layer of resist deposited thereon;

performing coarse lithography to remove said resist above portions of said walls of said divider;

continuing ramping of temperature of said plurality of single sliders, said resist and said divider to said proper softbake temperature and baking;

performing critical lithography to expose an air bearing surface pattern on each of said plurality of single sliders; and developing said pattern.

16. The method as recited in claim 15 wherein said slider divider is stainless steel.

17. The method as recited in claim 15 wherein said slider divider comprises islands to accommodate at least four of said plurality of single sliders.

18. The method as recited in claim 15 wherein said plurality of single sliders is held in place in said slider divider by a polymer adhesive.

19. The method as recited in claim 15 wherein said ramping partway to said softbake temperature allows said performing coarse lithography to occur before resist completely hardens.

20. The method as recited in claim 19 wherein said removing said resist above walls of said slider divider before resist completely hardens relieves stresses due to coefficient of thermal expansion mismatch between said divider, said resist and said slider material.

* * * * *